United States Patent
Kim et al.

(10) Patent No.: US 10,036,457 B2
(45) Date of Patent: Jul. 31, 2018

(54) PLANETARY GEAR TRAIN OF AUTOMATIC TRANSMISSION FOR VEHICLE

(71) Applicant: Hyundai Motor Company, Seoul (KR)

(72) Inventors: Jong Soo Kim, Seoul (KR); Jong Sool Park, Hwaseong-si (KR); Kyeong Hun Lee, Seoul (KR); Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 138 days.

(21) Appl. No.: 15/280,598

(22) Filed: Sep. 29, 2016

(65) Prior Publication Data

US 2017/0241528 A1    Aug. 24, 2017

(30) Foreign Application Priority Data

Feb. 19, 2016   (KR) .................. 10-2016-0019792

(51) Int. Cl.
*F16H 37/04*   (2006.01)
*F16H 3/66*    (2006.01)

(52) U.S. Cl.
CPC .............. *F16H 37/04* (2013.01); *F16H 3/66* (2013.01); *F16H 2037/048* (2013.01); *F16H 2200/006* (2013.01); *F16H 2200/201* (2013.01); *F16H 2200/2043* (2013.01)

(58) Field of Classification Search
CPC ......... F16H 2037/048; F16H 2200/201; F16H 2200/2041; F16H 2200/2043
See application file for complete search history.

(56) References Cited

U.S. PATENT DOCUMENTS 7,291,085 B2 * 11/2007 Park .................. F16H 3/66
                                                              475/280
8,303,452 B2 * 11/2012 Aota ................. F16H 3/66
                                                              475/275
9,644,723 B2 *  5/2017 Janson .............. F16H 37/042

FOREIGN PATENT DOCUMENTS

| DE | 102008001612 A1 * | 11/2009 | ............ F16H 47/04 |
| KR | 10-2002-0089024 A | 11/2002 | |
| KR | 10-2004-0011947 A |  2/2004 | |
| KR | 10-2012-0022267 A |  3/2012 | |
| KR | 10-2015-0071600 A |  6/2015 | |

* cited by examiner

*Primary Examiner* — Sherry L Estremsky
(74) *Attorney, Agent, or Firm* — Morgan, Lewis & Bockius LLP

(57) ABSTRACT

A planetary gear train of an automatic transmission for a vehicle may include a first planetary gear set, a second planetary gear set, a third planetary gear set, an input shaft, an output shaft disposed in parallel with the input shaft, a first shaft selectively acting as a fixed element, a second shaft directly connected with the input shaft, a third shaft, a fourth shaft selectively connectable with the second shaft, a fifth shaft selectively engaged with the output shaft, a sixth shaft selectively engaged with the output shaft, and transfer gears, each gear-meshed with one of the shafts.

19 Claims, 7 Drawing Sheets

FIG. 2

| Shift-stage | Control element | | | | | Gear ratio | Step ratio | Remark |
|---|---|---|---|---|---|---|---|---|
| | C1 | C2 | C3 | C4 | B1 | | | |
| D1 | ● | | | ● | ● | 5.53 | — | Gear ratio span : 8.71<br><br>Ratio of REV vs D1 : -0.79 |
| D2 | | ● | | ● | ● | 3.52 | 1.57 | |
| D3 | ● | ● | | ● | | 2.40 | 1.47 | |
| D4 | | ● | ● | ● | | 1.90 | 1.26 | |
| D5 | ● | | ● | ● | | 1.38 | 1.38 | |
| D6 | ● | ● | ● | | | 1.00 | 1.38 | |
| D7 | ● | | ● | | ● | 0.83 | 1.21 | |
| D8 | | ● | ● | | ● | 0.64 | 1.30 | |
| REV | | | ● | ● | ● | -4.36 | — | |

…

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2016-0019792, filed Feb. 19, 2016, the entire contents of which is incorporated herein for all purposes by this reference.

BACKGROUND OF THE INVENTION

Field of the Invention

The present invention relates to an automatic transmission for a vehicle.

Description of Related Art

Recent increases in oil prices are triggering stiff competition in enhancing fuel consumption of a vehicle. In this sense, research on an automatic transmission has been performed to simultaneously provide better drivability and fuel consumption by achieving more shift stages.

However, in order to achieve more shift stages for an automatic transmission, the number of parts is typically increased, which may deteriorate installability and/or power flow efficiency and may increase production cost, and weight.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to six control elements (frictional elements), and may easily become lengthy, thereby deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

In addition, a recent eight-speed automatic transmission typically shows a gear ratio span in a level of 6.5 to 7.5, which may require improvement for better fuel consumption.

Thus, shortening a length of an automatic transmission without deteriorating performance will be beneficial.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of realizing at least eight forward speeds and at least one reverse speed may be realized by a combination of three planetary gear sets, two external gears and five control elements, thereby providing improvement of power delivery performance and fuel consumption.

In addition, various aspects of the present invention are directed to providing a planetary gear train of an automatic transmission for a vehicle having a wide available range of varying gear teeth of transfer gears enabling easy obtaining of optimum gear ratios for respective vehicles, thereby improving power delivery performance and fuel consumption.

According to various aspects of the present invention, a planetary gear train of an automatic transmission for a vehicle may include a first planetary gear set including first, second, and third rotation elements, a second planetary gear set including fourth, fifth, and sixth rotation elements, a third planetary gear set including seventh, eighth, and ninth rotation elements, an input shaft mounted with the first, second, and third planetary gear sets at an external circumference of the input shaft, an output shaft disposed in parallel with the input shaft, a first shaft connecting the first rotation element and the sixth rotation element and selectively acting as a fixed element, a second shaft connected with the second rotation element and directly connected with the input shaft, a third shaft interconnecting the third rotation element and the seventh rotation element, a fourth shaft connecting the fourth rotation element and the ninth rotation element and selectively connectable with the second shaft, a fifth shaft connected with the fifth rotation element and selectively engaged with the output shaft, a sixth shaft connected with the eighth rotation element and selectively engaged with the output shaft, and transfer gears, each gear-meshed with one of the shafts.

The first planetary gear set may include a first sun gear as the first rotation element, a first planet carrier as the second rotation element, and a first ring gear as the third rotation element, the second planetary gear set may include a second sun gear as the fourth rotation element, a second ring gear as the fifth rotation element, and a second planet carrier as the sixth rotation element, and the third planetary gear set may include a third sun gear as the seventh rotation element, a third planet carrier as the eighth rotation element, and a third ring gear as the ninth rotation element.

The transfer gears may include a first transfer gear disposed between the sixth shaft and the output shaft, and a second transfer gear disposed between the fifth shaft and the output shaft.

Two rotation elements among the seventh, eighth, and ninth rotation elements may be selectively connectable such that the seventh, eighth, and ninth rotation elements integrally or monolitcally rotate.

The planetary gear train may further include a first clutch disposed between the second shaft and the fourth shaft, a second clutch disposed between the third shaft and the sixth shaft, a third clutch disposed between the sixth shaft and the first transfer gear, a fourth clutch disposed between the fifth shaft and the second transfer gear, and a first brake disposed between the first shaft and the transmission housing.

The planetary gear train may further include a first clutch disposed between the second shaft and the fourth shaft, a second clutch disposed between the third shaft and the fourth shaft, a third clutch disposed between the sixth shaft and the first transfer gear, a fourth clutch disposed between the fifth shaft and the second transfer gear, and a first brake disposed between the first shaft and the transmission housing.

The planetary gear train may further include a first clutch disposed between the second shaft and the fourth shaft, a second clutch disposed between the fourth shaft and the sixth shaft, a third clutch disposed between the sixth shaft and the first transfer gear, a fourth clutch disposed between the fifth shaft and the second transfer gear, and a first brake disposed between the first shaft and the transmission housing.

The planetary gear train may further include a first clutch disposed between the second shaft and the fourth shaft, a second clutch disposed between the third shaft and the sixth shaft, a third clutch disposed between the output shaft and the first transfer gear, a fourth clutch disposed between the fifth shaft and the second transfer gear, and a first brake disposed between the first shaft and the transmission housing.

The planetary gear train may further include a first clutch disposed between the second shaft and the fourth shaft, a second clutch disposed between the third shaft and the sixth shaft, a third clutch disposed between the sixth shaft and the first transfer gear, a fourth clutch disposed between the output shaft and the second transfer gear, and a first brake disposed between the first shaft and the transmission housing.

The planetary gear train may further include a first clutch disposed between the second shaft and the fourth shaft, a second clutch disposed between the third shaft and the sixth shaft, a third clutch disposed between the output shaft and the first transfer gear, a fourth clutch disposed between the output shaft and the second transfer gear, and a first brake disposed between the first shaft and the transmission housing.

According to various aspects of the present invention, a planetary gear train of an automatic transmission for a vehicle may include a first planetary gear set including first, second, and third rotation elements, a second planetary gear set including fourth, fifth, and sixth rotation elements, a third planetary gear set including seventh, eighth, and ninth rotation elements, an input shaft mounted with the first, second, and third planetary gear sets at an external circumference of the input shaft, an output shaft disposed in parallel with the input shaft, in which the first rotation element may be directly connected with the sixth rotation element and selectively connectable with the transmission housing, the second rotation element may be directly connected with the input shaft and selectively connectable with the fourth rotation element, the third rotation element may be directly connected with the seventh rotation element, the fourth rotation element may be directly connected with the ninth rotation element, the fifth rotation element may be selectively gear-meshed with the output shaft by a second transfer gear, and the eighth rotation element may be selectively gear-meshed with the output shaft by a first transfer gear.

The planetary gear train may further include a first clutch selectively connecting the second rotation element and the fourth rotation element, a second clutch selectively connecting the seventh rotation element and the eighth rotation element, a third clutch selectively connecting the eighth rotation element and the first transfer gear, a fourth clutch selectively connecting the fifth rotation element and the second transfer gear, and a first brake selectively connecting the sixth rotation element and the transmission housing.

The planetary gear train may further include a first clutch selectively connecting the second rotation element and the fourth rotation element, a second clutch selectively connecting the seventh rotation element and the ninth rotation element, a third clutch selectively connecting the eighth rotation element and the first transfer gear, a fourth clutch selectively connecting the fifth rotation element and the second transfer gear, and a first brake selectively connecting the sixth rotation element and the transmission housing.

The planetary gear train may further include a first clutch selectively connecting the second rotation element and the fourth rotation element, a second clutch selectively connecting the seventh rotation element and the eighth rotation element, a third clutch selectively connecting the output shaft and the first transfer gear, a fourth clutch selectively connecting the fifth rotation element and the second transfer gear, and a first brake selectively connecting the sixth rotation element and the transmission housing.

The planetary gear train may further include a first clutch selectively connecting the second rotation element and the fourth rotation element, a second clutch selectively connecting the seventh rotation element and the eighth rotation element, a third clutch selectively connecting the eighth rotation element and the first transfer gear, a fourth clutch selectively connecting the output shaft and the second transfer gear, and a first brake selectively connecting the sixth rotation element and the transmission housing.

The planetary gear train may further include a first clutch selectively connecting the second rotation element and the fourth rotation element, a second clutch selectively connecting the seventh rotation element and the eighth rotation element, a third clutch selectively connecting the output shaft and the first transfer gear, a fourth clutch selectively connecting the output shaft and the second transfer gear, and a first brake selectively connecting the sixth rotation element and the transmission housing.

According to a planetary gear train of various embodiments of the present invention, at least eight forward speeds and at least one reverse speed may be realized by employing two external gears in addition to a combination of three planetary gear sets, thereby providing a wide range of varying gear teeth so as to easily achieve optimum gear ratio and to easily comply with required performance for respective vehicles.

In addition, according to a planetary gear train of various embodiments of the present invention, a gear ratio span of more than 8.70 may be achieved while realizing at least eight forward speeds and at least one reverse speed, thereby maximizing an engine driving efficiency.

Furthermore, the linearity of step ratios of shift stages is secured while multi-staging the shift stage with high efficiency, thereby making it possible to improve drivability such as acceleration before and after a shift, an engine speed rhythmic sense, and the like.

Additionally, according to a planetary gear train of various embodiments of the present invention, three control elements are operated at respective shift-stages, thereby minimizing non-controlled control element so as to reduce a drag torque, improving a power transmission efficiency so as to reduce fuel consumption, reducing torque load of respective control elements, and enabling compactness of the transmission.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift-stages in a planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
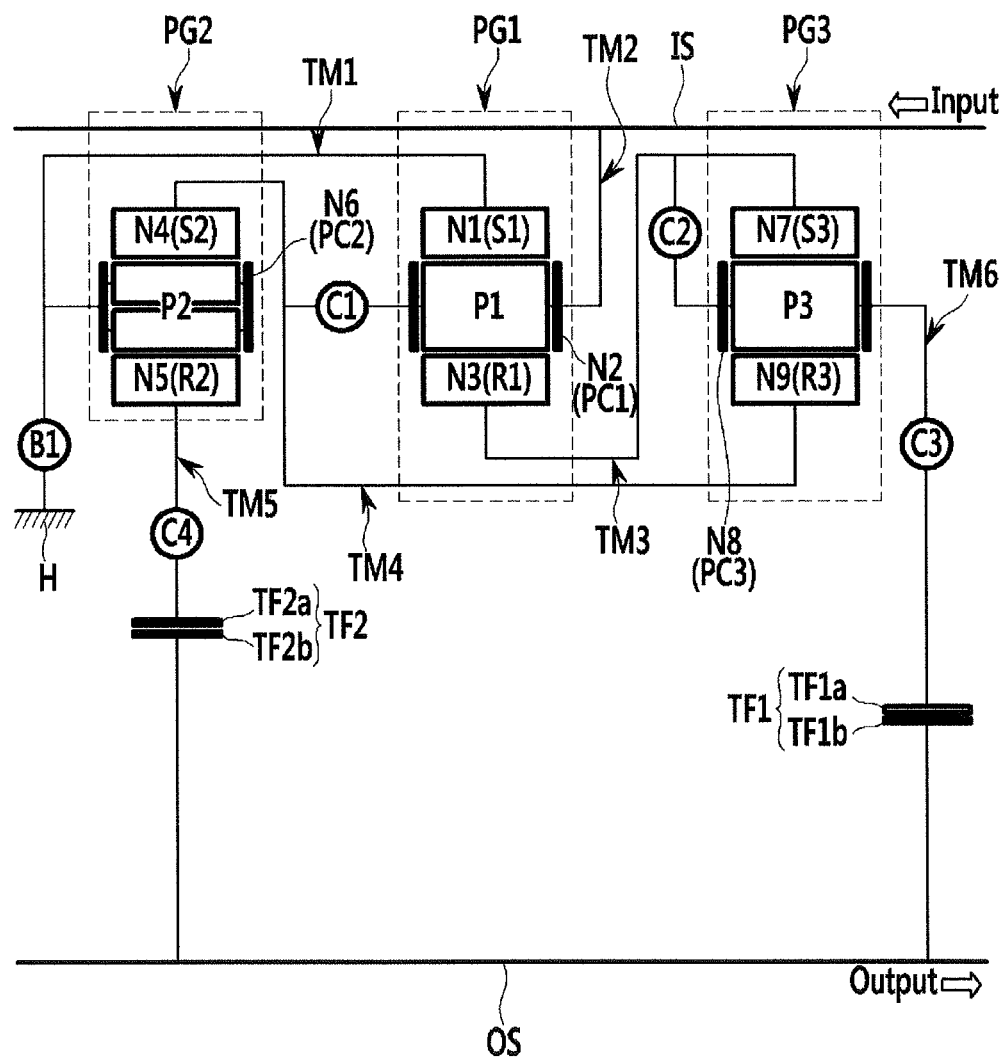
FIG. 1 is a schematic diagram of a planetary gear train according to various embodiments of the present invention.

FIG. 1 is a schematic diagram of a planetary gear train according to a first exemplary embodiment of the present invention.

Referring to FIG. 1, a planetary gear train according to a first exemplary embodiment of the present invention includes an input shaft IS, an output shaft OS, first, second, and third planetary gear sets PG1, PG2, and PG3, two transfer gears TF1 and TF2, and five control elements C1, C2, C3, C4, and B1.

The input shaft IS is an input member and the torque from a crankshaft of an engine is input into the input shaft IS, after being torque-converted through a torque converter.

The output shaft OS is an output member, and, arranged in parallel with the input shaft IS, outputs a shifted driving torque to a drive shaft through a differential apparatus.

The first, second, and third planetary gear sets PG1, PG2, and PG3 are arranged in the order of the third planetary gear set PG3, the first planetary gear set PG1, and the second planetary gear set PG2, from an engine side.

The first planetary gear set PG1 is a single pinion planetary gear set, and includes a first sun gear S1, a first planet carrier PC1 that supports first pinion P1 externally engaged with the first sun gear S1, and a first ring gear R1 that is internally engaged with the first pinion P1. The first sun gear S1 acts as a first rotation element N1, the first planet carrier PC1 acts as a second rotation element N2, and the first ring gear R1 acts as a third rotation element N3.

The second planetary gear set PG2 is a double pinion planetary gear set, and includes a second sun gear S2, a second ring gear R2 that is internally engaged with a second pinion P2 externally engaged with the second sun gear S2, and a second planet carrier PC2 that supports the second pinion P2. The second sun gear S2 acts as a fourth rotation element N4, the second ring gear R2 acts as a fifth rotation element N5, and the second planet carrier PC2 acts as a sixth rotation element N6.

The third planetary gear set PG3 is a single pinion planetary gear set, and includes a third sun gear S3, a third planet carrier PC3 that supports third pinion P3 externally engaged with the third sun gear S3, and a third ring gear R3 that is internally engaged with the third pinion P3. The third sun gear S3 acts as a seventh rotation element N7, the third planet carrier PC3 acts as a eighth rotation element N8, and the third ring gear R3 acts as a ninth rotation element N9.

In the arrangement of the first, second, and third planetary gear sets PG1, PG2, and PG3, the first rotation element N1 is directly connected with the sixth rotation element N6, the third rotation element N3 is directly connected with the seventh rotation element N7, and the fourth rotation element N4 is directly connected with the ninth rotation element N9, by six shafts TM1 to TM6.

The six shafts TM1 to TM6 are hereinafter described in detail

The first shaft TM1 interconnects the first rotation element N1 (first sun gear S1) and the sixth rotation element N6 (second planet carrier PC2), and is selectively connectable with the transmission housing H, thereby selectively acting as a fixed element.

The second shaft TM2 is connected with the second rotation element N2 (first planet carrier PC1) and directly connected with the input shaft IS, and continuously acts as an input element.

The third shaft TM3 interconnects the third rotation element N3 (first ring gear R1) and the seventh rotation element N7 (third sun gear S3).

The fourth shaft TM4 interconnects the fourth rotation element N4 (second sun gear S2) and the ninth rotation element N9 (third ring gear R3), and is selectively connectable with the second shaft TM2, thereby selectively receiving the torque of the input shaft.

The fifth shaft TM5 is connected with the fifth rotation element N5 (second ring gear R2), and selectively engaged with the output shaft OS, externally.

The sixth shaft TM6 is connected with the eighth rotation element N8 (third planet carrier PC3), and selectively engaged with the output shaft OS, externally.

The two transfer gears TF1 and TF2 delivers a shifted torque of the first, second, and third planetary gear sets PG1, PG2, and PG3 to the output shaft OS, in a reverse rotation.

The first transfer gear TF1 includes a first transfer drive gear TF1a connected with the sixth shaft TM6 and a first transfer driven gear TF1b connected with the output shaft OS, and externally gear-meshes the sixth shaft TM6 and the output shaft OS.

The second transfer gear TF2 includes a second transfer drive gear TF2a connected with the fifth shaft TM5 and a second transfer driven gear TF2b connected with the output shaft OS, and externally gear-meshes the fifth shaft TM5 and the output shaft OS.

As a result, respective shafts connected by the first and second transfer gears TF1 and TF2 rotate in opposite directions, and the gear ratios of the first and second transfer gears TF1 and TF2 may be preset in consideration of required speed ratio of the transmission.

The control elements include the four clutches C1, C2, C3, and C4 and the one brake B1, and are arranged as follows.

The first clutch C1 is arranged between the second shaft TM2 and the fourth shaft TM4, such that the second shaft TM2 and the fourth shaft TM4 may selectively become integral.

The second clutch C2 is arranged between the third shaft TM3 and the sixth shaft TM6, such that the third shaft TM3 and the sixth shaft TM6 may selectively become integral.

The third clutch C3 is arranged between the sixth shaft TM6 and the first transfer gear TF1, such that the sixth shaft TM6 and the first transfer gear TF1 may selectively become integral.

The fourth clutch C4 is arranged between the fifth shaft TM5 and the second transfer gear TF2, such that the fifth shaft TM5 and the second transfer gear TF2 may selectively become integral.

The first brake B1 is arranged between the first shaft TM1 and the transmission housing H, such that the first shaft TM1 may selectively act as a fixed element.

The second clutch C2 selectively connects at least two rotation elements among the seventh, eighth, and ninth rotation elements N7, N8, and N9 of the third planetary gear set PG3, such that the third planetary gear set PG3 may integrally or monolitcally rotate. The second clutch C2 selectively connects two shafts among the third, fourth, and sixth shafts TM3, TM4, and TM6, such that the third planetary gear set PG3 becomes locked and integrally or monolitcally rotates.

In a first exemplary embodiment of the present invention, the second clutch C2 is arranged at a location to selectively connect the third shaft TM3 and the sixth shaft TM6 such that the second clutch C2 selectively connects the seventh and eighth rotation elements N7 and N8 among the seventh, eighth, and ninth rotation elements N7, N8, and N9 of the third planetary gear set PG3.

Each of the control elements of the first, second, third, and fourth clutch C1, C2, C3, and C4 and the first brake B1 may be realized as multi-plate hydraulic pressure friction devices that are frictionally engaged by hydraulic pressure.

FIG. 2 is an operational chart for respective control elements at respective shift-stages in a planetary gear train according to a first exemplary embodiment of the present invention.

Referring to FIG. 2, a planetary gear train according to an exemplary embodiment of the present invention realizes shifting by operating three control elements among the four clutches C1, C2, C3, and C4 and the one brake B1.

[The Forward First Speed]
In the forward first speed shift-stage D1, the first and fourth clutches C1 and C4 and the first brake B1 are operated.

As a result, the second shaft TM2 is connected with the fourth shaft TM4 by the operation of the first clutch C1, and the fifth shaft TM5 is connected with second transfer gear TF2 by the operation of the fourth clutch C4. In this state, the torque of the input shaft IS is input to the second shaft TM2, and the first shaft TM1 acts as a fixed element by the operation of the first brake B1, thereby realizing the forward first speed by cooperative operation of respective shafts and outputting a shifted torque to the output shaft OS.

[The Forward Second Speed]
In the forward second speed shift-stage D2, the second and fourth clutches C2 and C4 and the first brake B1 are operated.

As a result, the third shaft TM3 is connected with the sixth shaft TM6 by the operation of the second clutch C2, and the fifth shaft TM5 is connected with second transfer gear TF2 by the operation of the fourth clutch C4. In this state, the torque of the input shaft IS is input to the second shaft TM2, and the first shaft TM1 acts as a fixed element by the operation of the first brake B1, thereby realizing the forward second speed by cooperative operation of respective shafts and outputting a shifted torque to the output shaft OS.

[The Forward Third Speed]
In the forward third speed shift-stage D3, the first, second, and fourth clutches C1, C2, and C4 are operated.

As a result, the second shaft TM2 is connected with the fourth shaft TM4 by the operation of the first clutch C1, the third shaft TM3 is connected with the sixth shaft TM6 by the operation of the second clutch C2, and the fifth shaft TM5 is connected with second transfer gear TF2 by the operation of the fourth clutch C4. In this state, the torque of the input shaft IS is input to the second shaft TM2, thereby realizing the forward third speed by cooperative operation of respective shafts and outputting a shifted torque to the output shaft OS.

[The Forward Fourth Speed]
In the forward fourth speed shift-stage D4, the second, third, and fourth clutches C2, C3, and C4 are operated.

As a result, the third shaft TM3 is connected with the sixth shaft TM6 by the operation of the second clutch C2, the sixth shaft TM6 is connected with the first transfer gear TF1 by the operation of the third clutch C3, and the fifth shaft TM5 is connected with second transfer gear TF2 by the operation of the fourth clutch C4. In this state, the torque of the input shaft IS is input to the second shaft TM2, thereby realizing the forward fourth speed by cooperative operation of respective shafts and outputting a shifted torque to the output shaft OS.

[The Forward Fifth Speed]
In the forward fifth speed shift-stage D5, the first, third, and fourth clutches C1, C3, and C4 are operated.

As a result, the second shaft TM2 is connected with the fourth shaft TM4 by the operation of the first clutch C1, the sixth shaft TM6 is connected with the first transfer gear TF1 by the operation of the third clutch C3, and the fifth shaft TM5 is connected with second transfer gear TF2 by the operation of the fourth clutch C4. In this state, the torque of the input shaft IS is input to the second shaft TM2, thereby realizing the forward fifth speed by cooperative operation of respective shafts and outputting a shifted torque to the output shaft OS.

[The Forward Sixth Speed]
In the forward sixth speed shift-stage D6, the first, second, and third clutches C1, C2, and C3 are operated.

As a result, the second shaft TM2 is connected with the fourth shaft TM4 by the operation of the first clutch C1, the third shaft TM3 is connected with the sixth shaft TM6 by the operation of the second clutch C2, and the sixth shaft TM6 is connected with first transfer gear TF1 by the operation of the third clutch C3. In this state, the torque of the input shaft IS is input to the second shaft TM2, thereby realizing the forward sixth speed by cooperative operation of respective shafts and outputting a shifted torque to the output shaft OS.

[The Forward Seventh Speed]

In the forward seventh speed shift-stage D7, the first and third clutches C1 and C3 and the first brake B1 are operated.

As a result, the second shaft TM2 is connected with the fourth shaft TM4 by the operation of the first clutch C1, and the sixth shaft TM6 is connected with first transfer gear TF1 by the operation of the third clutch C3. In this state, the torque of the input shaft IS is input to the second shaft TM2, and the first shaft TM1 acts as a fixed element by the operation of the first brake B1, thereby realizing the forward seventh speed by cooperative operation of respective shafts and outputting a shifted torque to the output shaft OS.

[The Forward Eighth Speed]

In the forward eighth speed shift-stage D8, the second and third clutches C2 and C3 and the first brake B1 are operated.

As a result, the third shaft TM3 is connected with the sixth shaft TM6 by the operation of the second clutch C2, and the sixth shaft TM6 is connected with first transfer gear TF1 by the operation of the third clutch C3. In this state, the torque of the input shaft IS is input to the second shaft TM2, and the first shaft TM1 acts as a fixed element by the operation of the first brake B1, thereby realizing the forward eighth speed by cooperative operation of respective shafts and outputting a shifted torque to the output shaft OS.

[The Reverse Speed]

In the reverse speed REV, the third and fourth clutches C3 and C4 and the first brake B1 are operated.

As a result, the sixth shaft TM6 is connected with the first transfer gear TF1 by the operation of the third clutch C3, and the fifth shaft TM5 is connected with second transfer gear TF2 by the operation of the fourth clutch C4. In this state, the torque of the input shaft IS is input to the second shaft TM2, and the first shaft TM1 acts as a fixed element by the operation of the first brake B1, thereby realizing the reverse speed by cooperative operation of respective shafts and outputting a reverse torque to the output shaft OS.

FIG. 2 shows gear ratios calculated under the condition that the gear ratio of the first ring gear R1/the first sun gear S1 is 1.74, the gear ratio of the second ring gear R2/the second sun gear S2 is 2.31, the gear ratio of the third ring gear R3/the third sun gear S3 is 1.73, the gear ratio of the first transfer driven gear TF1b/the first transfer drive gear TF1a is 2.00, and the gear ratio of the second transfer driven gear TF2b/the second transfer drive gear TF2a is 3.40. However, the present invention is not limited to specific figures, since the FIGS. may be changed under the spirit of the present invention.

Figure 3:
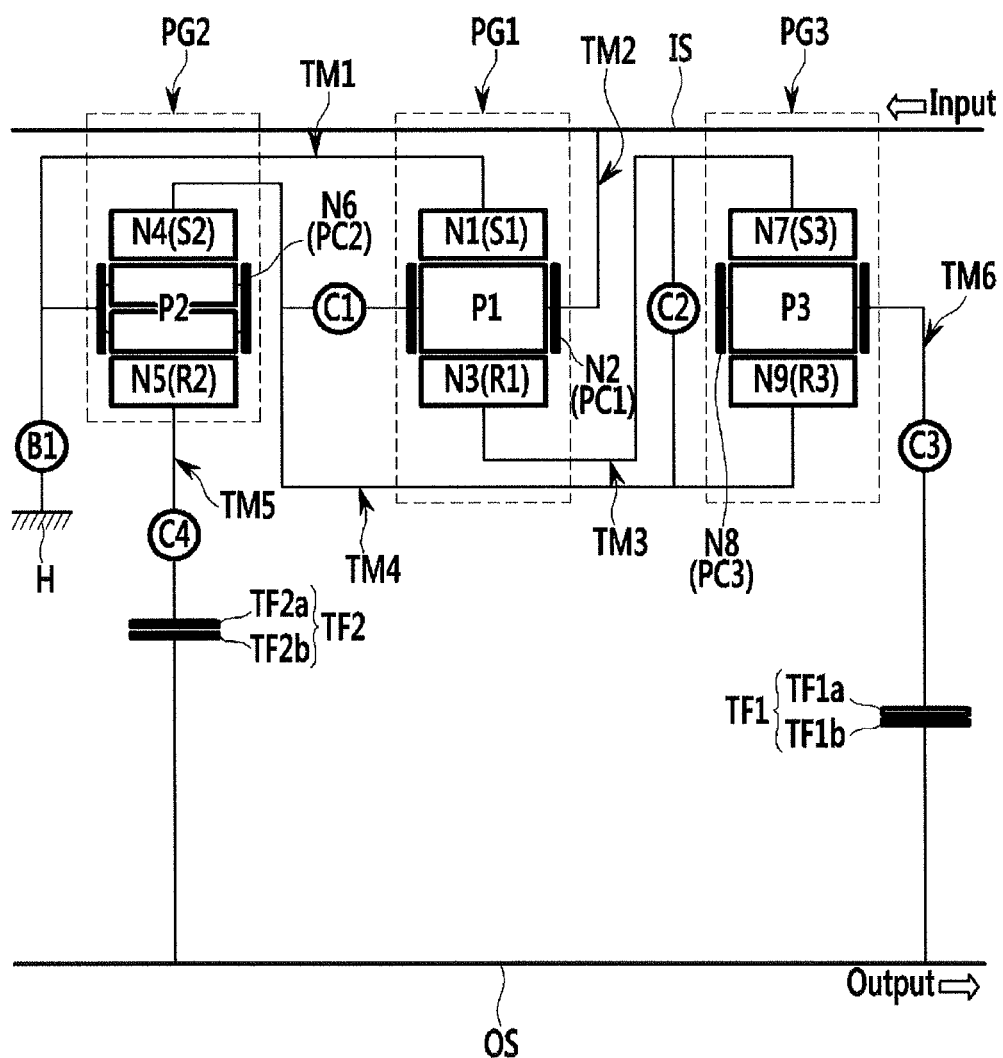
FIG. 3 is a schematic diagram of a planetary gear train according to various embodiments of the present invention.

FIG. 3 is a schematic diagram of a planetary gear train according to a second exemplary embodiment of the present invention.

In a planetary gear train according to a first exemplary embodiment of the present invention, the second clutch C2 for unifying the third planetary gear set PG3 is arranged between the third shaft TM3 and the sixth shaft TM6 as shown in FIG. 1. However, referring to FIG. 3, the second clutch C2 is arranged between the third shaft TM3 and the fourth shaft TM4 in a planetary gear train according to a second exemplary embodiment of the present invention.

As a result, the second exemplary embodiment shows the same function and operation, while being different from the first exemplary embodiment in a mere location of the second clutch C2.

Figure 4:
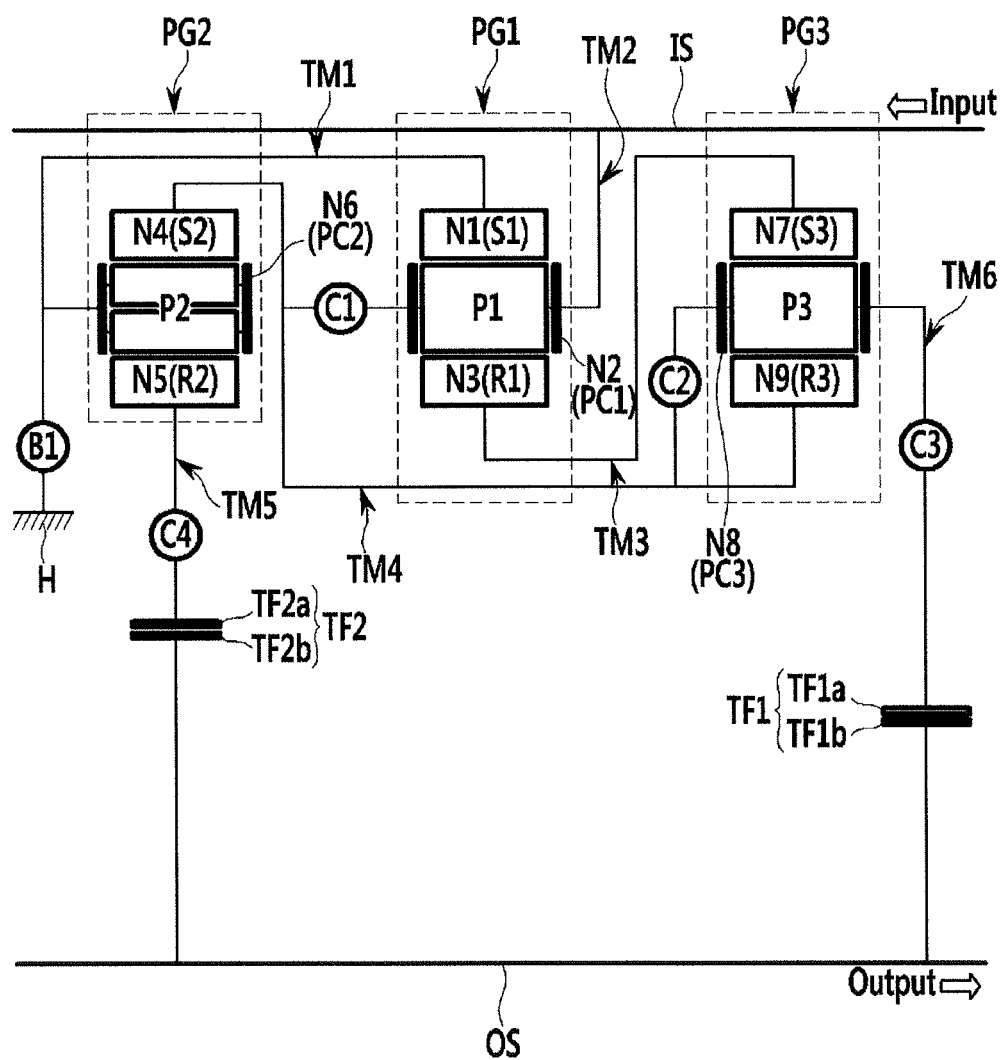
FIG. 4 is a schematic diagram of a planetary gear train according to various embodiments of the present invention.

FIG. 4 is a schematic diagram of a planetary gear train according to a third exemplary embodiment of the present invention.

In a planetary gear train according to a first exemplary embodiment of the present invention, the second clutch C2 for unifying the third planetary gear set PG3 is arranged between the third shaft TM3 and the sixth shaft TM6 as shown in FIG. 1. However, referring to FIG. 4, the second clutch C2 is arranged between the fourth shaft TM4 and the sixth shaft TM6 in a planetary gear train according to a third exemplary embodiment of the present invention.

As a result, the third exemplary embodiment shows the same function and operation, while being different from the first exemplary embodiment in a mere location of the second clutch C2.

Figure 5:
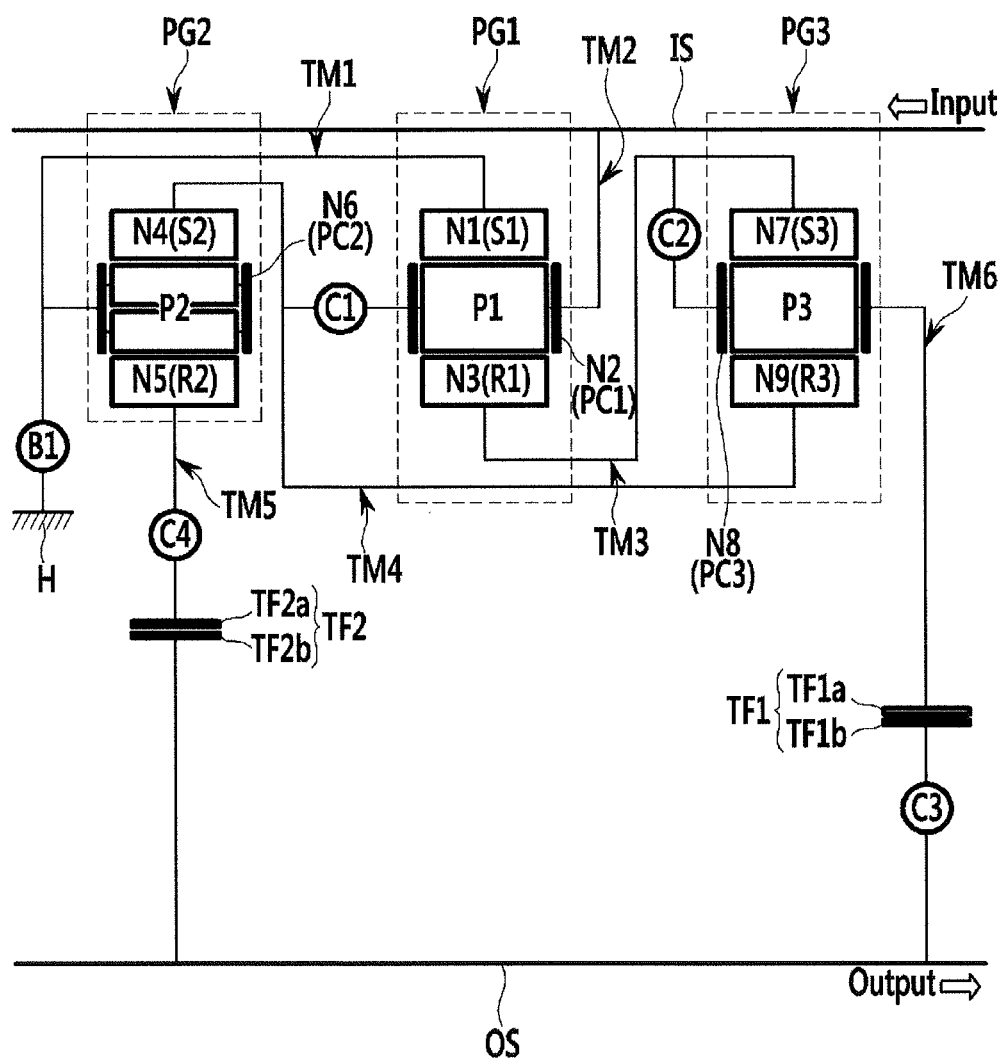
FIG. 5 is a schematic diagram of a planetary gear train according to various embodiments of the present invention.

FIG. 5 is a schematic diagram of a planetary gear train according to a fourth exemplary embodiment of the present invention.

In a planetary gear train according to first, second, and third exemplary embodiments of the present invention, the third clutch C3 is arranged between the sixth shaft TM6 and the first transfer gear TF1 as shown in FIG. 1, FIG. 3, and FIG. 4. However, referring to FIG. 5, the third clutch C3 is arranged between the output shaft OS and the first transfer gear TF1 in a planetary gear train according to a fourth exemplary embodiment.

As a result, the fourth exemplary embodiment maintains the same function of transmitting the torque of the sixth shaft TM6 to the output shaft OS, while being different from the first, second, and third exemplary embodiments in a mere location of the third clutch C3.

Figure 6:
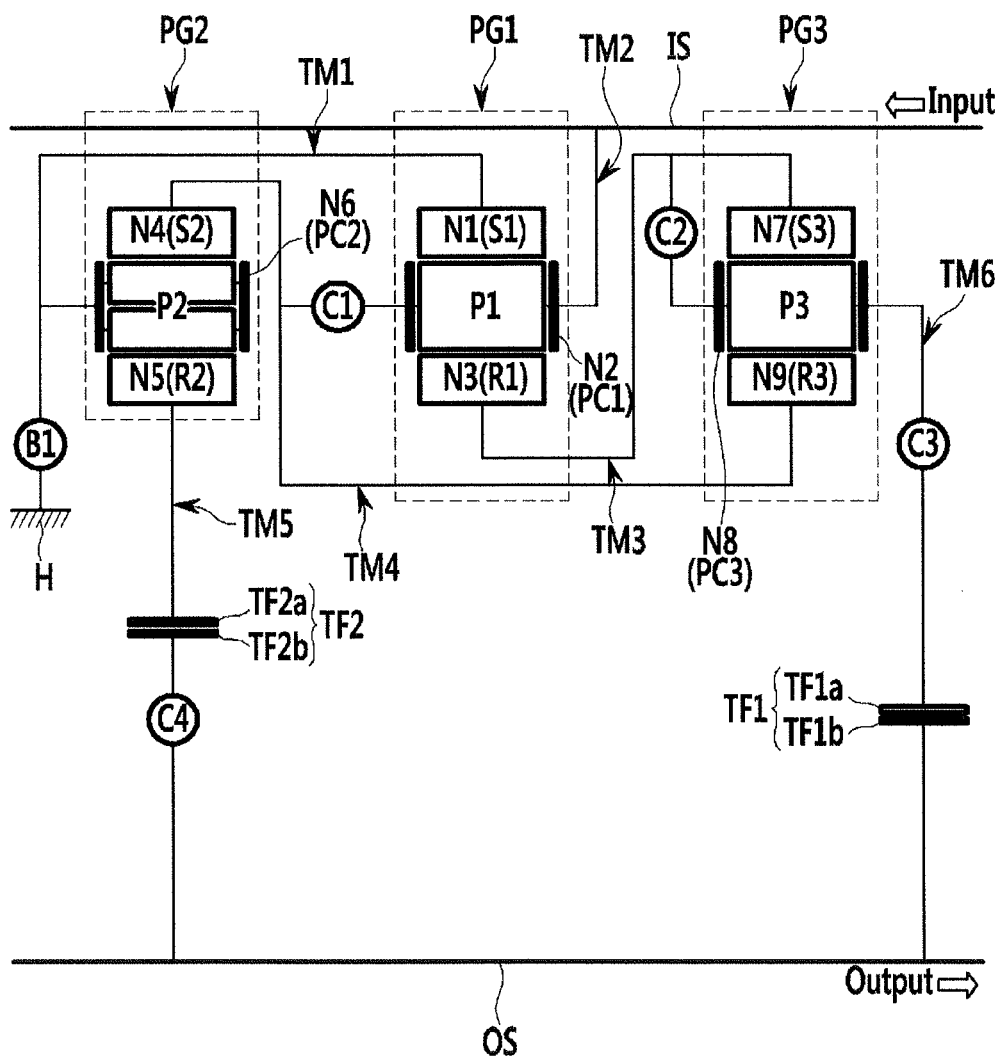
FIG. 6 is a schematic diagram of a planetary gear train according to various embodiments of the present invention.

FIG. 6 is a schematic diagram of a planetary gear train according to a fifth exemplary embodiment of the present invention.

In a planetary gear train according to a first, second, and third exemplary embodiment of the present invention, the fourth clutch C4 is arranged between the fifth shaft TM5 and the second transfer gear TF2, as shown in FIG. 1, FIG. 3, and FIG. 4. However, referring to FIG. 6, the fourth clutch C4 is arranged between the output shaft OS and the second transfer gear TF2 according to the fifth exemplary embodiment.

As a result, the fifth exemplary embodiment maintains the function of selectively transmitting the torque of the fifth shaft TM5 to the output shaft OS, while being different from the first, second, and third exemplary embodiments in a mere location of the fourth clutch C4.

Figure 7:
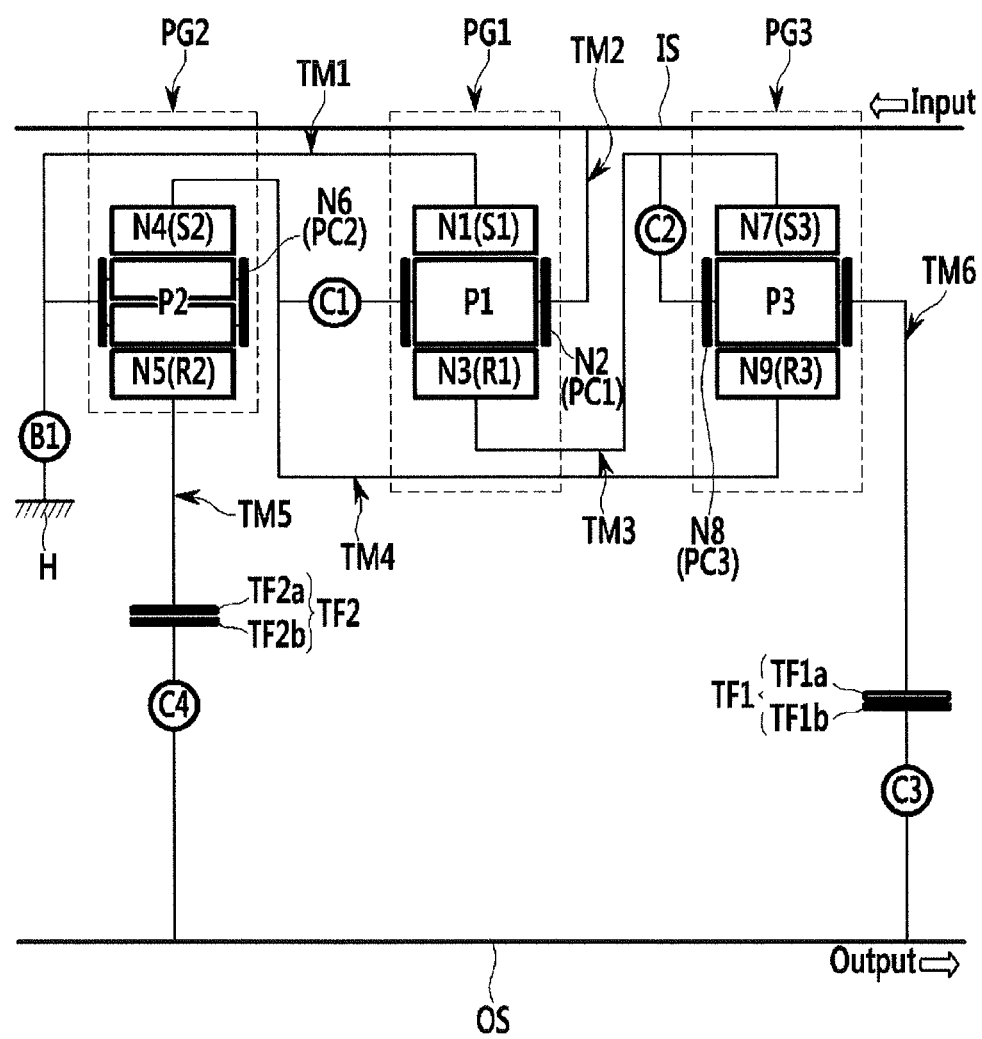
FIG. 7 is a schematic diagram of a planetary gear train according to various embodiments of the present invention.

FIG. 7 is a schematic diagram of a planetary gear train according to a sixth exemplary embodiment of the present invention.

In a planetary gear train according to a first, second, and third exemplary embodiments of the present invention, the third clutch C3 is arranged between the sixth shaft TM6 and the first transfer gear TF1, and the fourth clutch C4 is arranged between the fifth shaft TM5 and the second transfer gear TF2, as shown in FIG. 1, FIG. 3, and FIG. 4. However, referring to FIG. 7, the third clutch C3 is arranged between the output shaft OS and the first transfer gear TF1, and the fourth clutch C4 is arranged between the output shaft OS and the second transfer gear TF2, according to the sixth exemplary embodiment.

As a result, the sixth exemplary embodiment maintains the function of selectively transmitting the torque of the sixth and fifth shafts TM6 and TM5 to the output shaft OS, while being different from the first, second, and third exemplary embodiments in mere locations of the third and fourth clutches C3 and C4.

As described above, according to a planetary gear train according to an exemplary embodiment of the present invention, at least eight forward speeds and at least one reverse speed may be realized by a combination of three planetary gear sets, two external gears and five control elements, thereby providing improvement of power delivery performance and fuel consumption.

In addition, according to a planetary gear train according to an exemplary embodiment of the present invention, two transfer gears of external gears arranged on the output shaft OS are employed in addition to three planetary gear sets, and thus, gear teeth may be widely varied so as to easily achieve optimum gear ratio and to easily comply with required performance for respective vehicles.

In addition, according to a planetary gear train according to an exemplary embodiment of the present invention, a gear ratio span of more than 8.70 may be achieved while realizing at least eight forward speeds and at least one reverse speed, thereby maximizing an engine driving efficiency.

In addition, the linearity of step ratios of shift stages is secured while multi-staging the shift stage with high efficiency, thereby making it possible to improve drivability such as acceleration before and after a shift, an engine speed rhythmic sense, and the like.

In addition, according to a planetary gear train according to an exemplary embodiment of the present invention, three control elements are operated at respective shift-stages, thereby minimizing non-controlled control element so as to reduce a drag torque, improving a power transmission efficiency so as to reduce fuel consumption, reducing torque load of respective control elements, and enabling compactness of the transmission.

For convenience in explanation and accurate definition in the appended claims, the terms "upper", "lower", "inner" and "outer", "up," "down," "upper", "lower," "upwards," "downwards", "front", "rear", "back", "inside", "outside", "inwardly," "outwardly," "interior", "exterior", "inner," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    an input shaft mounted with the first, second, and third planetary gear sets at an external circumference of the input shaft;
    an output shaft disposed in parallel with the input shaft;
    a first shaft connecting the first rotation element and the sixth rotation element and selectively acting as a fixed element;
    a second shaft connected with the second rotation element and directly connected with the input shaft;
    a third shaft interconnecting the third rotation element and the seventh rotation element;
    a fourth shaft connecting the fourth rotation element and the ninth rotation element and selectively connectable with the second shaft;
    a fifth shaft connected with the fifth rotation element and selectively engaged with the output shaft;
    a sixth shaft connected with the eighth rotation element and selectively engaged with the output shaft; and
    transfer gears, each gear-meshed with one of the first, second, third, fourth, fifth, and sixth shafts.

2. The planetary gear train of claim 1, wherein
    the first planetary gear set comprises a first sun gear as the first rotation element, a first planet carrier as the second rotation element, and a first ring gear as the third rotation element;
    the second planetary gear set comprises a second sun gear as the fourth rotation element, a second ring gear as the fifth rotation element, and a second planet carrier as the sixth rotation element; and
    the third planetary gear set comprises a third sun gear as the seventh rotation element, a third planet carrier as the eighth rotation element, and a third ring gear as the ninth rotation element.

3. The planetary gear train of claim 1, wherein the transfer gears comprise:
    a first transfer gear disposed between the sixth shaft and the output shaft; and
    a second transfer gear disposed between the fifth shaft and the output shaft.

4. The planetary gear train of claim 3, wherein two rotation elements among the seventh rotation element, the eighth rotation element, and the ninth rotation element are selectively connectable such that the seventh rotation element, the eighth rotation element, and the ninth rotation element integrally or monolitcally rotate.

5. The planetary gear train of claim 4, further comprising:
    a first clutch disposed between the second shaft and the fourth shaft;
    a second clutch disposed between the third shaft and the sixth shaft;
    a third clutch disposed between the sixth shaft and the first transfer gear;
    a fourth clutch disposed between the fifth shaft and the second transfer gear; and
    a first brake disposed between the first shaft and a transmission housing.

6. The planetary gear train of claim 4, further comprising:
    a first clutch disposed between the second shaft and the fourth shaft;
    a second clutch disposed between the third shaft and the fourth shaft;
    a third clutch disposed between the sixth shaft and the first transfer gear;

a fourth clutch disposed between the fifth shaft and the second transfer gear; and
a first brake disposed between the first shaft and a transmission housing.

7. The planetary gear train of claim 4, further comprising:
a first clutch disposed between the second shaft and the fourth shaft;
a second clutch disposed between the fourth shaft and the sixth shaft;
a third clutch disposed between the sixth shaft and the first transfer gear;
a fourth clutch disposed between the fifth shaft and the second transfer gear; and
a first brake disposed between the first shaft and a transmission housing.

8. The planetary gear train of claim 4, further comprising:
a first clutch disposed between the second shaft and the fourth shaft;
a second clutch disposed between the third shaft and the sixth shaft;
a third clutch disposed between the output shaft and the first transfer gear;
a fourth clutch disposed between the fifth shaft and the second transfer gear; and
a first brake disposed between the first shaft and a transmission housing.

9. The planetary gear train of claim 4, further comprising:
a first clutch disposed between the second shaft and the fourth shaft;
a second clutch disposed between the third shaft and the sixth shaft;
a third clutch disposed between the sixth shaft and the first transfer gear;
a fourth clutch disposed between the output shaft and the second transfer gear; and
a first brake disposed between the first shaft and a transmission housing.

10. The planetary gear train of claim 4, further comprising:
a first clutch disposed between the second shaft and the fourth shaft;
a second clutch disposed between the third shaft and the sixth shaft;
a third clutch disposed between the output shaft and the first transfer gear;
a fourth clutch disposed between the output shaft and the second transfer gear; and
a first brake disposed between the first shaft and a transmission housing.

11. A planetary gear train of an automatic transmission for a vehicle, comprising:
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
an input shaft mounted with the first, second, and third planetary gear sets at an external circumference of the input shaft;
an output shaft disposed in parallel with the input shaft,
wherein the first rotation element is directly connected with the sixth rotation element and selectively connectable with a transmission housing,
the second rotation element is directly connected with the input shaft and selectively connectable with the fourth rotation element,
the third rotation element is directly connected with the seventh rotation element,
the fourth rotation element is directly connected with the ninth rotation element,
the fifth rotation element is selectively gear-meshed with the output shaft by a second transfer gear, and
the eighth rotation element is selectively gear-meshed with the output shaft by a first transfer gear.

12. The planetary gear train of claim 11, wherein
the first planetary gear set comprises a first sun gear as the first rotation element, a first planet carrier as the second rotation element, and a first ring gear as the third rotation element;
the second planetary gear set comprises a second sun gear as the fourth rotation element, a second ring gear as the fifth rotation element, and a second planet carrier as the sixth rotation element; and
the third planetary gear set comprises a third sun gear as the seventh rotation element, a third planet carrier as the eighth rotation element, and a third ring gear as the ninth rotation element.

13. The planetary gear train of claim 11, wherein two rotation elements among the seventh rotation element, the eighth rotation element, and the ninth rotation element are selectively connectable such that the seventh rotation element, the eighth rotation element, and the ninth rotation element integrally or monolitcally rotate.

14. The planetary gear train of claim 13, further comprising:
a first clutch selectively connecting the second rotation element and the fourth rotation element;
a second clutch selectively connecting the seventh rotation element and the eighth rotation element;
a third clutch selectively connecting the eighth rotation element and the first transfer gear;
a fourth clutch selectively connecting the fifth rotation element and the second transfer gear; and
a first brake selectively connecting the sixth rotation element and the transmission housing.

15. The planetary gear train of claim 13, further comprising:
a first clutch selectively connecting the second rotation element and the fourth rotation element;
a second clutch selectively connecting the seventh rotation element and the ninth rotation element;
a third clutch selectively connecting the eighth rotation element and the first transfer gear;
a fourth clutch selectively connecting the fifth rotation element and the second transfer gear; and
a first brake selectively connecting the sixth rotation element and the transmission housing.

16. The planetary gear train of claim 13, further comprising:
a first clutch selectively connecting the second rotation element and the fourth rotation element;
a second clutch selectively connecting the eighth rotation element and the ninth rotation element;
a third clutch selectively connecting the eighth rotation element and the first transfer gear;
a fourth clutch selectively connecting the fifth rotation element and the second transfer gear; and
a first brake selectively connecting the sixth rotation element and the transmission housing.

17. The planetary gear train of claim 13, further comprising:
- a first clutch selectively connecting the second rotation element and the fourth rotation element;
- a second clutch selectively connecting the seventh rotation element and the eighth rotation element;
- a third clutch selectively connecting the output shaft and the first transfer gear;
- a fourth clutch selectively connecting the fifth rotation element and the second transfer gear; and
- a first brake selectively connecting the sixth rotation element and the transmission housing.

18. The planetary gear train of claim 13, further comprising:
- a first clutch selectively connecting the second rotation element and the fourth rotation element;
- a second clutch selectively connecting the seventh rotation element and the eighth rotation element;
- a third clutch selectively connecting the eighth rotation element and the first transfer gear;
- a fourth clutch selectively connecting the output shaft and the second transfer gear; and
- a first brake selectively connecting the sixth rotation element and the transmission housing.

19. The planetary gear train of claim 13, further comprising:
- a first clutch selectively connecting the second rotation element and the fourth rotation element;
- a second clutch selectively connecting the seventh rotation element and the eighth rotation element;
- a third clutch selectively connecting the output shaft and the first transfer gear;
- a fourth clutch selectively connecting the output shaft and the second transfer gear; and
- a first brake selectively connecting the sixth rotation element and the transmission housing.

* * * * *